United States Patent [19]
Ono et al.

[11] Patent Number: 6,057,900
[45] Date of Patent: May 2, 2000

[54] COLOR LIQUID CRYSTAL DISPLAY DEVICE AND METHOD FOR PRODUCING COLOR FILTER SUBSTRATE

[75] Inventors: Norikatsu Ono, Narashino; Masayuki Ando, Funabashi; Yutaka Otsuki; Hiroyoshi Omika, both of Yokohama, all of Japan

[73] Assignees: Dai Nippon Printing Co., Ltd.; Nippon Oil Co., Ltd., both of Tokyo, Japan

[21] Appl. No.: 09/113,999

[22] Filed: Jul. 10, 1998

Related U.S. Application Data

[63] Continuation of application No. 08/596,065, Feb. 6, 1996.

[30] Foreign Application Priority Data

Feb. 9, 1995 [JP] Japan ................................ 7-044762

[51] Int. Cl.[7] ...................... G02F 1/1333; G02F 1/1335; G02F 1/1339
[52] U.S. Cl. ........................... 349/110; 349/106; 349/153
[58] Field of Search ................................ 349/106, 110, 349/153, 138, 84

[56] References Cited

U.S. PATENT DOCUMENTS

| | | | |
|---|---|---|---|
| 4,927,493 | 5/1990 | Yamazaki et al. | 349/153 |
| 5,214,541 | 5/1993 | Yamashita et al. | 430/7 |
| 5,214,542 | 5/1993 | Yamashita et al. | 430/7 |
| 5,236,793 | 8/1993 | Nishiwaki et al. | 430/7 |
| 5,278,683 | 1/1994 | Nishida et al. | 216/20 |
| 5,314,769 | 5/1994 | Yamashita et al. | 430/7 |
| 5,334,468 | 8/1994 | Yamashita et al. | 430/7 |
| 5,372,902 | 12/1994 | Yamashita et al. | 430/7 |
| 5,396,356 | 3/1995 | Fukuchi et al. | 349/106 |
| 5,422,207 | 6/1995 | Yoda et al. | 430/7 |
| 5,439,582 | 8/1995 | Oka et al. | 205/135 |
| 5,478,681 | 12/1995 | Yamashita et al. | 430/7 |
| 5,527,648 | 6/1996 | Otsuki et al. | 430/7 |
| 5,619,358 | 4/1997 | Tanaka et al. | 349/143 |
| 5,631,753 | 5/1997 | Hamaguchi et al. | 349/110 |
| 5,641,595 | 6/1997 | Hseih et al. | 430/7 |
| 5,844,645 | 12/1998 | Kashimoto | 349/106 |

FOREIGN PATENT DOCUMENTS

WO 93/07518   4/1993   WIPO.

*Primary Examiner*—William L. Sikes
*Assistant Examiner*—Dung Nguyen
*Attorney, Agent, or Firm*—Darby & Darby

[57] ABSTRACT

A color liquid crystal display device contains a color filter substrate, a counterelectrode substrate disposed to oppose the color filter substrate via a sealing material disposed in contact with peripheral portions of the color filter substrate and the counterelectrode substrate, and a liquid crystal layer sealed between the color filter substrate and the counterelectrode substrate and surrounded by the sealing material. The color filter substrate contains a transparent substrate, a black matrix and a plurality of colored layers of plural colors, the black matrix and the colored layers being formed in a predetermined pattern in a first region on the transparent substrate, and a resin layer having substantially same thickness as that of the black matrix and formed in a second peripheral region on the transparent substrate positioned peripherally adjacent to the first region. The sealing material is in contact with the resin layer and a black matrix portion in periphery of the first region. A method for producing the color filter substrate involves the steps for forming the resin layer having substantially the same thickness as that of the black matrix.

10 Claims, 5 Drawing Sheets

COLOR LIQUID CRYSTAL DISPLAY DEVICE AND METHOD FOR PRODUCING COLOR FILTER SUBSTRATE

This is a continuation of application Ser. No. 08/596,065, filed Feb. 6, 1996. Each of these prior applications is hereby incorporated herein by reference, in its entirety.

BACKGROUND OF THE INVENTION

This invention relates to a color liquid crystal display device and a method for producing a color filter substrate. More particularly, it relates to a color liquid crystal display device having superior display quality and high reliability, and a method for producing a color filter substrate employed therefor.

Recently, attention is drawn to a color liquid crystal display device as a flat panel display device. In general, a color liquid crystal display device is of such a construction in which a liquid crystal layer is sandwiched between a color filter substrate having a black matrix and colored layers of plural colors, usually red (R), green (G) and blue (B) colors, and a counterelectrode substrate. A color image is produced by controlling light transmittance of the portions of the liquid crystal layer in register with respective pixels of the colored layers R, G and B. Thus, the color filter substrate is indispensable to the color liquid crystal display device and represents a crucial member influencing the display quality itself of the color liquid crystal display device.

Heretofore, the black matrix of the color filter substrate is formed by photolithographically patterning a chromium or chromium oxide layer formed by sputtering or vapor deposition. On the other hand, the colored layers of the color filter substrate are formed by a dyeing method comprising dyeing a pattern obtained by coating dyeing materials and subjecting to light exposure via a photomask followed by development, a pigment dispersion method comprising previously dispersing coloring pigments in a photosensitive resist and subsequently exposing to light the resulting dispersant via a photomask followed by development, or a printing method comprising printing respective colors using printing inks.

However, the color filter substrate comprised of the black matrix and the colored layers, is complicated in the production process and high in production cost, while being unable to fully satisfy the properties required of the color filter substrate. Thus, a demand has been raised for a color filter substrate which is less expensive and higher in performance.

For meeting such demand, a black matrix having colorants, pigments, carbon black or fine metal particles dispersed in a resin is attracting attention insofar as the material aspect is concerned. Such black matrix is fabricated by a black photoresist method comprising dispersing colorants, pigments, carbon black or fine metal particles in a photosensitive resin and subsequently patterning the resulting dispersant by a photolithographic technique. The black matrix may also be fabricated by an electroless plating method comprising precipitating fine metal particles into a resin, or an electrodeposition method comprising forming an electrodeposition coating containing colorants, pigments, carbon black or fine metal particles and carrying out electrodeposition.

In addition, an electrodeposition method is excellent in utilization efficiency of coating materials and production capability and the time for forming the black matrix or the colored layers is as short as about several ten seconds. Thus, the electrodeposition method attracts attention insofar as the production process is concerned.

With such electrodeposition method, a transparent electrically conductive layer is formed on a transparent substrate, and a positive photoresist layer is formed on the transparent electrically conductive layer. The resulting assembly is exposed to light via a mask having a pre-set pattern, and the light exposed portion is dissolved and removed for laying-open a pre-set portion of the transparent electrically conductive layer. The transparent substrate is then immersed in an electrodeposition solution of a pre-set color, and electrical current is supplied from the transparent electrically conductive layer on the transparent substrate for electrodeposition. The black matrix and the colored layers are sequentially formed by repetition of the electrodepositing operations. After the black matrix and the colored layers are formed in this manner on the substrate, the entire surface of the substrate is irradiated with UV rays for removing the positive photoresist layer. A transparent electrically conductive layer for driving the liquid crystal layer is then formed on the black matrix and the colored layers. A polyimide alignment layer is then applied on the transparent electrically conductive layer. The color filter substrate is produced after baking and rubbing by way of alignment processing.

In producing a color filter substrate and a counterelectrode substrate employed for a color liquid crystal display device, a plurality of color filters, that is, not less than two filters for large-sized office equipments and six to twelve color filters for small-sized 4 to 6 inch class handy television receivers, are placed thereon for improving the production efficiency. The color filter substrate having plural color filters thereon and the counterelectrode substrate, are bonded together to form a large number of cells and are subsequently cut by a glass scriber into unit cells. These cells are processed with liquid crystal injection, sealing of the injection ports, boding of polarizing plates, formation of driving ICs and peripheral circuitry and provision of backlights and a casing to complete a color liquid crystal display device.

However, with the color liquid crystal display device employing a color filter substrate having the above-described resin-based black matrix and colored layers, it is difficult to set the thickness of the black matrix to not larger than 1.5 $\mu$m in consideration of light-shielding characteristics proper to the black matrix, thus raising various problems due to step differences at the boundary portions between the black matrix forming region and the remaining region.

Figure 6:
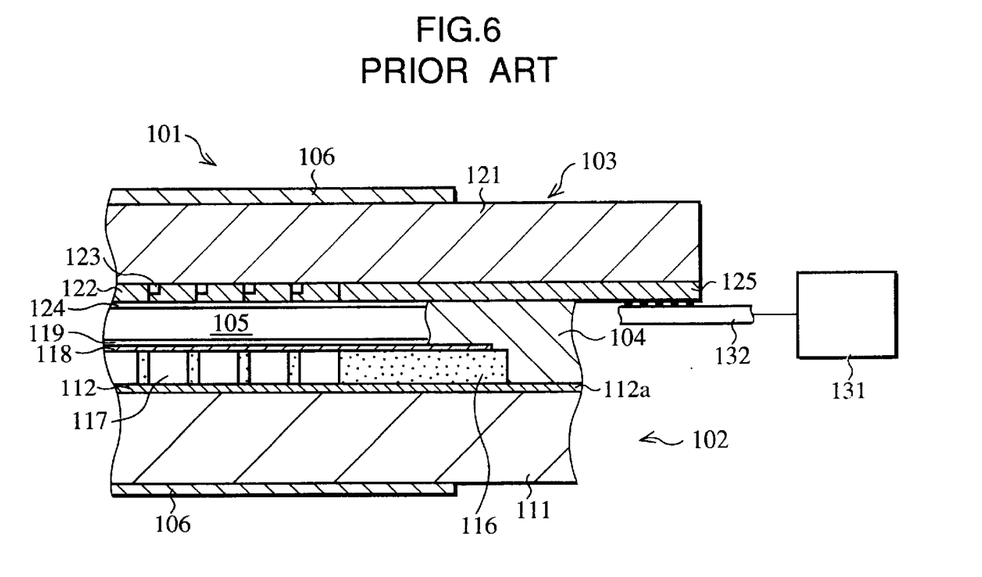
FIG. 6 is a partial cross-sectional view showing the vicinity of an edge portion of a conventional color liquid crystal display device employing a color filter substrate fabricated by the electrodeposition method.

FIG. 6 shows, in a partial cross-sectional view, the vicinity of an edge portion of a conventional color liquid crystal display device 101 employing a color filter substrate fabricated using the electrodeposition method. Referring to FIG. 6, the conventional color liquid crystal display device 101 has a color filter substrate 102 and a counterelectrode substrate 103 facing each other with interposition of a pre-set gap. The peripheral portions of the two substrates 102, 103 are sealed with a sealing material 104 and a liquid crystal layer 105 is formed between the two substrates 102, 103. Polarizing plates 106, 106 are provided on the outer sides of the color filter substrate 102 and the counterelectrode substrate 103. On a transparent substrate 111 of the color filter substrate 102 are formed a black matrix 116 and colored layers 117 in a pre-set pattern via a transparent electrically conductive layer 112. A transparent electrode 118 for driving the liquid crystal and an alignment layer 119 are further formed thereon. The counterelectrode substrate 103 has on its transparent substrate 121 a transparent electrode 122 for driving the liquid crystal and thin film transistors (TFT) 123, and an alignment layer 124 is formed for overlying the transparent electrode 122. The counterelectrode substrate 103 carries gate bus lines, not shown, for turning the thin film transistors (TFT) 123 on and off, source bus lines, not shown, for furnishing video signals, and voltage supply lines to the color filter electrode from the corners of the color filter substrate. The lead wires 125 are formed of metals, such as Al, collectively formed in the course of the production process of the thin film transistors (TFT) 123, and are connected to the transparent electrode 122 and to an electrical connection line 132 from the external driving IC 131.

With the above-described conventional color liquid crystal display device 101, the sealing material 104 for bonding the color filter substrate 102 and the counterelectrode substrate 103 to each other for forming plural cells is configured to abut against both the peripheral portions of the black matrix 116 and the transparent electrically conductive layer 112. However, the step difference of not less than 1.5 $\mu$m is produced between the black matrix forming region and the black matrix non-forming region, that is the exposed portion of the transparent electrically conductive layer 112, as described above. Due to this step difference, the sealing material cannot be applied with high precision, resulting in variation in the coating quantity of the sealing material and insufficient hermetic sealing of the cells and possibly leading to operational troubles of the liquid crystal under high temperature and high humidity conditions. On the other hand, when the color filter substrate 102 and the counterelectrode substrate 103 are pressed against and bonded to each other, a spacer for controlling the gap is incorporated into the sealing material for coping with the step difference. However, the sealing material is then liable to flow non-uniformly, thus producing sealing troubles and leading to failure in producing high cell gap precision.

SUMMARY OF THE INVENTION

It is an object of the present invention to provide a color liquid crystal display device having high reliability and superior display quality even under hostile conditions, such as high temperature and high humidity, and a method for producing a color filter substrate employed for the color liquid crystal display device.

It is another object of the present invention to provide a color liquid crystal display device having high cell gap precision due to prohibition of sealing troubles produced when bonding the color filter substrate to the counterelectrode for forming cells, and a method for producing a color filter substrate employed for the color liquid crystal display device.

The above and other objects of the present invention will become apparent from the following description.

According to the present invention, there is provided a color liquid crystal display device including a color filter substrate, a counterelectrode substrate disposed to oppose the color filter substrate via a sealing material disposed in contact with peripheral portions of the color filter substrate and the counterelectrode substrate, and a liquid crystal layer sealed between the color filter substrate and the counterelectrode substrate and surrounded by the sealing material. The color filter substrate includes a transparent substrate, a black matrix and a plurality of colored layers of plural colors. The black matrix and the colored layers are formed in a predetermined pattern in a first region on the transparent substrate. The color filter substrate also includes a resin layer having substantially same thickness as that of the black matrix and formed in a second peripheral region on the transparent substrate positioned peripherally adjacent to the first region. The sealing material is in contact with the resin layer and a black matrix portion in the periphery of the first region.

According to the present invention, there is also provided a method for producing a color filter substrate including the steps of (i) forming a transparent electrically conductive layer on a transparent substrate followed by forming a photosensitive coating film on the transparent electrically conductive layer, (ii) subjecting the photosensitive coating film in a predetermined first region to stepwise light exposure where light exposure amounts are different in at least three steps, and (iii) developing the photosensitive coating film in an order of decreasing light exposure amounts to expose the transparent electrically conductive layer followed by forming by electrodeposition predetermined patterns of a black matrix and a colored layer of at least one color in an order of the transparent electrically conductive layer being exposed while leaving a resin layer composed of the photosensitive coating film in a second peripheral region positioned peripherally adjacent to the first region. The resin layer has substantially same thickness as that of the black matrix.

According to the present invention, there is also provided a method for producing a color filter substrate including the steps of (1) forming a transparent electrically conductive layer on a transparent substrate followed by forming a photosensitive coating film on the transparent electrically conductive layer, (ii) subjecting the photosensitive coating film in a predetermined first region to stepwise light exposure where light exposure amounts are different in at least three steps, (iii) developing the photosensitive coating film in an order of decreasing light exposure amounts to expose the transparent electrically conductive layer followed by forming by electrodeposition predetermined patterns of a black matrix and a colored layer of at least one color in an order of the transparent electrically conductive layer being exposed, and (iv) exposing to light an overall surface of the photosensitive coating film to expose the transparent electrically conductive layer in a second peripheral region positioned peripherally adjacent to the first region followed by forming by electrodeposition a resin layer on the exposed transparent electrically conductive layer in the second peripheral region. The resin layer is selected from the group consisting of a black matrix and a colored layer and has substantially same thickness as that of the black matrix formed in the step (iii).

According to the present invention, there is also provided a method for producing a color filter substrate including the steps of (i) forming a transparent electrically conductive layer on a transparent substrate followed by forming a photosensitive coating film on the transparent electrically conductive layer, and (ii) subjecting the photosensitive coating film in a predetermined first region and in a second peripheral region positioned peripherally adjacent to the first region to stepwise light exposure where light exposure amounts are different in at least three steps, and (iii) developing the photosensitive coating film in an order of decreasing light exposure amounts to expose the transparent electrically conductive layer followed by forming by electrodeposition predetermined patterns of a black matrix and a colored layer of at least one color in an order of the transparent electrically conductive layer being exposed. A resin layer is simultaneously formed by electrodeposition in the second peripheral region. The rein layer is selected from the group consisting of a black matrix and a colored layer and has substantially same thickness as that of the black matrix in the first region.

According to the present invention, there is also provided a method for producing a color filter substrate including the steps of (i) forming a transparent electrically conductive layer on a transparent substrate followed by forming a photosensitive coating film on the transparent electrically conductive layer and (ii) repeating subjecting the photosensitive coating film in a predetermined first region to light exposure, followed by development and then electrodeposition for respectively forming each of a black matrix and a plurality of colored layers of plural colors in predetermined patterns, while leaving a resin layer composed of the photosensitive coating film in a second peripheral region positioned peripherally adjacent to the first region. The resin layer has substantially same thickness as that of the black matrix.

According to the present invention, there is also provided a method for producing a color filter substrate including the steps of (i) forming a transparent electrically conductive layer on a transparent substrate followed by forming a photosensitive coating film on the transparent electrically conductive layer, (ii) repeating subjecting the photosensitive coating film in a predetermined first region to light exposure, followed by development and then electrodeposition for respectively forming each of a black matrix and a plurality of colored layers of plural colors in predetermined patterns, and (iii) exposing to light an overall surface of the photosensitive coating film to expose the transparent electrically conductive layer in a second peripheral region positioned peripherally adjacent to the first region followed by forming by electrodeposition a rein layer on the exposed transparent electrically conductive layer in the second peripheral region. The resin layer is selected from the group consisting of a black matrix and a colored layer, and has substantially same thickness as that of the black matrix formed in the step (ii).

According to the present invention, there is also provided a method for producing a color filter substrate including the steps of (i) forming a transparent electrically conductive layer on a transparent substrate followed by forming a photosensitive coating film on the transparent electrically conductive layer, and (ii) repeating subjecting the photosensitive coating film in a predetermined first region to light exposure, followed by development and then electrodeposition for respectively forming each of a black matrix and a plurality of colored layers of plural colors in predetermined patterns, while simultaneously subjecting to light exposure the photosensitive coating film in a second peripheral region positioned peripherally adjacent to the first region followed by development to expose the transparent electrically conductive layer and forming by electrodeposition a resin layer in the second peripheral region. The resin layer is selected from the group consisting of a black matrix and a colored layer, and has substantially same thickness as that of the black matrix formed in the first region.

PREFERRED EMBODIMENTS OF THE INVENTION

Referring to the drawings, preferred embodiments of the present invention will be explained in detail.

Figure 1:
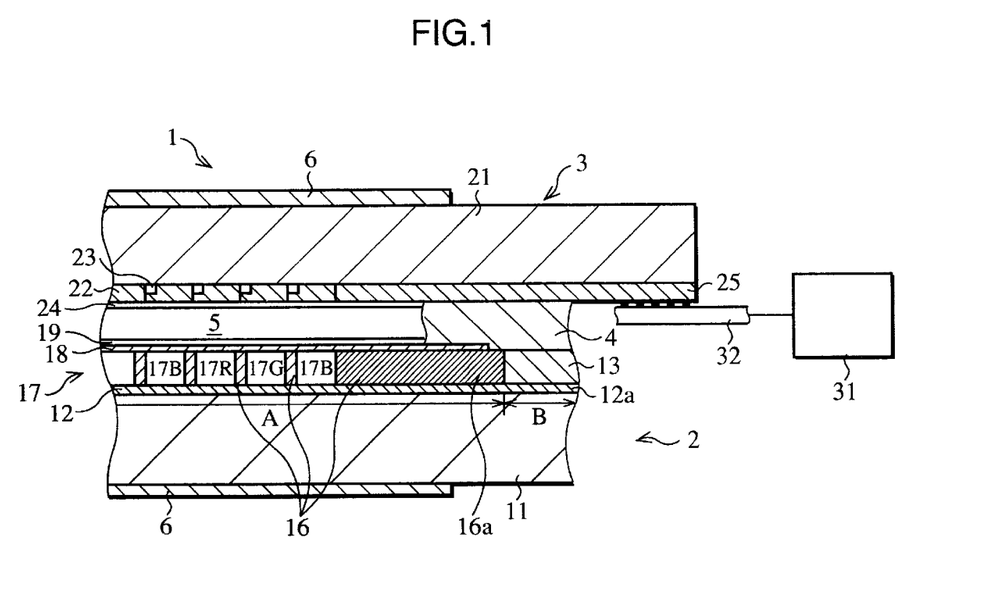
FIG. 1 is a partial cross-sectional view showing the vicinity of an edge portion of a color liquid crystal display device according to the present invention.

Referring first to FIG. 1, showing an embodiment of the color liquid crystal display device 1 according to the present invention, the device 1 includes a color filter substrate 2 and a counterelectrode substrate 3 opposing to each other with interposition of a pre-set gap, with peripheral portions of the substrates 2 and 3 being sealed by a sealing material 4. A liquid crystal layer 5 of a thickness on the order of 5 to 10 $\mu$m is formed between the two substrates. On the outer sides of the color filter substrate 2 and the counterelectrode substrate 3 are arranged polarizing plates 6, 6.

The color filter substrate 2 of the color liquid crystal display device 1 of the present invention has a transparent substrate 11 on which a black matrix 16 and colored layers 17 are formed with a pre-set pattern with interposition of a transparent electrically conductive layer 12. A transparent electrode 18 for driving liquid crystal and an alignment layer 19 are further formed thereon. The transparent electrically conductive layer 12 is divided into a region A in which the black matrix 16 and the colored layers 17 are formed, and a region B disposed adjacent to the region A. A resin layer 13 is formed in the region B. The liquid crystal display device of the present invention is characterized by the thickness of the resin layer 13 being substantially equal to the thickness of the black matrix 16. The sealing material 4 is arranged for abutting against both a black matrix 16a lying on a peripheral portion of the region A and the resin layer 13 for sealing the peripheral portions of the color filter substrate 2 and the counterelectrode substrate 3. The resin layer 13 provided in the region B is effective to prevent a step difference from being formed between the region B and the black matrix 16 disposed in the region A. Thus, the sealing material 4 configured for abutting against the resin layer 13 and the black matrix 16a dispersed in the region A, becomes uniform in thickness for prohibiting sealing troubles between the color filter substrate 2 and the counterelectrode substrate 3, thus producing a liquid crystal cell of high cell gap precision and hence a color liquid crystal display device of high display quality and high reliability. The black matrix is of a thickness usually of 1.0 to 3.0 $\mu$m.

Although there is no limitation to the material of the resin layer 13, it is preferably of a positive or negative type photosensitive resin since it is necessary to form the rein layer 13 only in the region B disposed at an outer peripheral portion of the black matrix 16. For forming the rein layer 13 of the photosensitive resin, the photosensitive resin is preferably applied by known methods, such as by a spin coater or a roll coater, on the transparent substrate 11, on which the black matrix 16 and the colored layers 17 are previously formed, and the photosensitive resin is exposed to light via a pre-set mask followed by development. The thickness of the resin layer 13 needs to be set in meeting with that of the black matrix 16. The difference in thickness with respect to the black matrix 16 is preferably not more than 0.8 $\mu$m. If the difference in thickness with respect to the black matrix 16 exceeds 0.8 $\mu$m, the sealing material tends to be coated non-uniformly, thus leading to sealing troubles or lowering in cell gap precision. It goes without saying that the smaller the difference in thickness between the black matrix 16 and the resin layer 13, the better the quality is.

As another method for forming the resin layer 13, it may be formed simultaneously with formation of the black matrix and the colored layers by the electrodeposition method. In such case, the photosensitive resist material is coated on the transparent electrically conductive layer 12 of the transparent substrate 11 for forming the photosensitive coating film. Subsequently, light exposure, development and electrodeposition are repeatedly carried out in the region A for forming the colored layers 17 of a pre-set number of colors and the black matrix 16. The resin layer 13 of the photosensitive coating film is formed in the region B simultaneously with the completion of formation of the colored layers 17 and the black matrix 16, thus simplifying the process. Alternatively, the overall surface of the photosensitive coating film may be exposed to light before forming the colored layer of the ultimate color followed by development and electrodeposition for forming the ultimate colored layer and the resin layer 13 of the ultimate colored layer in the region B. In this case, the process is simplified and is similar to that described above except for the difference in the ultimate light exposed region. For forming the resin layer 13 as the colored layer, the resin layer 13 may also be formed in the region B simultaneously when forming the black matrix 16 and the colored layers 17. Thus, the resin layer 13 is formed in the color of the black matrix or in the colors of the colored layers.

The method of forming the rein layer 13 by the electrodeposition method is not limited to forming both the colored layers and the black matrix by the electrodeposition method as described above. For example, it is also possible to pattern the transparent electrically conductive layer 12 only in an area where the colored layers are to be formed, and to form the colored layers by the electrodeposition method and the black matrix is formed by the conventional black photoresist method or electroless plating method, respectively.

As for the colored layers 17, a red pattern 17R, a green pattern 17G and a blue pattern 17B are arrayed in a desired configuration, such as mosaic type, stripe type, triangular type or 4-pixel arrangement type. The black matrix 16 is arranged between the respective colored patterns and peripherally adjacent to the region of the colored layers 17.

On the other hand, the counterelectrode substrate 3 constituting the color liquid crystal display device 1 according to the present invention, has a transparent electrode 22 and thin film transistors (TFT) 23 for driving the liquid crystal both disposed on a transparent substrate 21. An alignment layer 24 is formed for overlying the transparent electrode 22. The counterelectrode substrate 3 carries gate bus lines, not shown, for turning the thin film transistors (TFT) 23 on and off, source bus lines, not shown, for furnishing video signals, and voltage supply lines to the color filter electrode from the corners of the color filter substrate. The lead wires 25 are formed of metals, such as Al, collectively formed in the course of the production process of the thin film transistors (TFT) 23, and are connected to the transparent electrode 22 and to an electrical connection line 32 from the external driving IC 31.

The transparent substrates 11, 21 making up the color filter substrate 2 and the counterelectrode substrate 3 of the color liquid crystal display device 1 may be formed of non-flexible rigid materials, such as quartz glass, pyrex glass or synthetic quartz plates, or flexible materials, such as transparent resin films or optical resin plates. Of these, "7059 glass" manufactured by CORNING JAPAN KK is suited for a color liquid crystal display device by active matrix addressing since it is a non-alkaline glass material of low thermal expansion coefficient and excellent dimensional stability and workability for high temperature heating processing. In addition, "AN635" manufactured by ASAHI GLASS CO., LTD. or "OA2" manufactured by NIPPON ELECTRIC GLASS CO. LTD., with low BaO content and high resistance against chemicals, are also preferably employed.

The transparent electrically conductive layer 12 and the transparent electrodes 18, 22 constituting the color liquid crystal display device 1, are formed by customary film-forming methods, such as sputtering, vacuum deposition or chemical vapor deposition (CVD) using indium tin oxide (ITO), zinc oxide (ZnO), tin oxide (SnO) or alloys thereof. The transparent electrically conductive layer 12 and the transparent electrodes 18, 22 may have thicknesses ranging from 0.01 to 1 $\mu$m and preferably 0.03 to 0.5 $\mu$m.

With the color liquid crystal display device shown in FIG. 1, the transparent electrically conductive layer 12 if formed across the regions A and B, and has an end portion 12a laid open to outside on an outer rim portion of the color liquid crystal display device 1. With the color liquid crystal display device according to the present invention, the end portion 12a of the transparent electrically conductive layer 12 may be electrically insulated from the transparent electrically conductive layer 12 positioned in the region A. The end portion 12a of the transparent electrically conductive layer is electrically insulated in this manner from the region A of the black matrix 16 or the colored layers 17, even if the color liquid crystal display device is placed in a high temperature high humidity atmosphere or in a dew-forming atmosphere such that an electrical by-pass is formed between the end portion 12a of the transparent electrically conductive layer 12 and the connection line 32 as later explained, the lead line 25 of the counterelectrode substrate 3 or the connection line 32 is prevented from being broken by electrolytic corrosion, thus improving the operational reliability. For achieving such insulation, a cut-out may be formed by removing a pre-set portion of the transparent electrically conductive layer 12 lying in the region B by etching or laser processing prior to formation of the colored layers or the black matrix, or by laser processing a pre-set portion of the transparent electrically conductive layer 12 lying in the region B subsequent to formation of the colored layers or the black matrix.

The alignment layers 19, 24 of the color liquid crystal display device 1 may be formed of a material containing at least one of polyimide-, polyamide-, polyurethane- and polyurea-based organic compounds, and may have a thickness on the order of 0.01 to 1 $\mu$m and preferably 0.03 to 0.5 $\mu$m. Such alignment layers 19, 24 may be applied by known methods, such as printing or coating, and may be subsequently baked and processed for alignment, such as by rubbing.

Although the TFT active matrix addressing is employed as a driving system, the color liquid crystal display device of the present invention is not limited to this driving system. Thus, for example, a simple matrix or segment addressing or an active matrix addressing employing two-terminal devices, such as metal/insulator/metal devices, may be employed.

Referring to FIG. 2, a first embodiment of the method for producing a color filter substrate according to the present invention is explained.

Figure 2A:
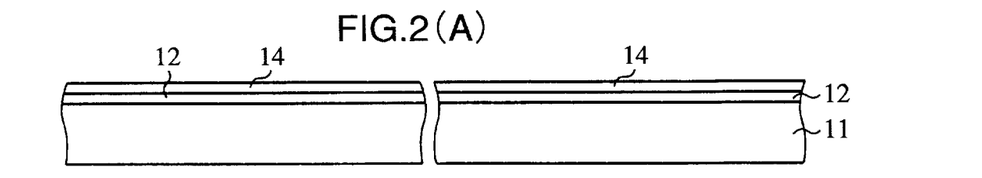
FIGS. 2A to 2F are schematic views for illustrating an embodiment of the method for producing a color filter substrate according to the present invention.

First, at step (i), a transparent electrically conductive layer 12 formed of indium tin oxide (ITO), for example is formed on the overall surface of the transparent substrate 11 having plural color filters thereon. A photosensitive resist is then applied on the transparent electrically conductive layer 12 for forming a photosensitive coating film 14, as shown in FIG. 2A.

Figure 2B:
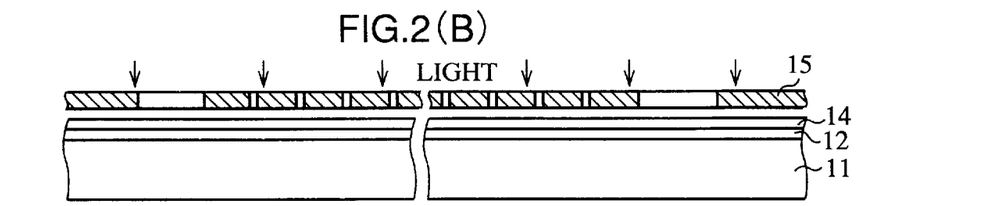
Figure 2C:
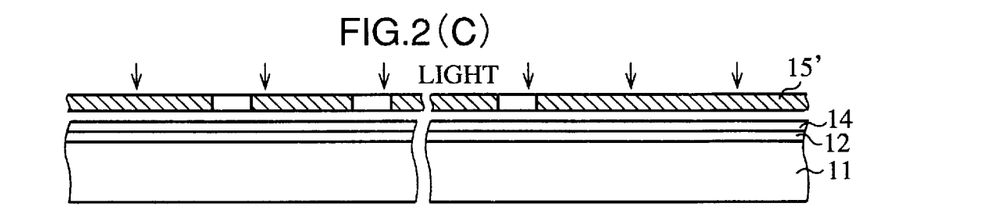

At the next step (ii), the photosensitive coating film 14 is exposed to light via a photomask 15 corresponding to a desired pattern, such as a black matrix pattern (FIG. 2B). The photosensitive coating film 14 is then exposed to light via a photomask 15' corresponding to a red-hued pattern 17R, a green-hued pattern 17G and a blue-hued pattern 17B (FIG. 2C). This light exposure is carried out as stepwise light exposure in which the amount of the exposing light is decreased stepwise in the order of, for example, the black matrix, the red-hued pattern, the green-hued pattern and the blue-hued pattern.

Figure 2D:
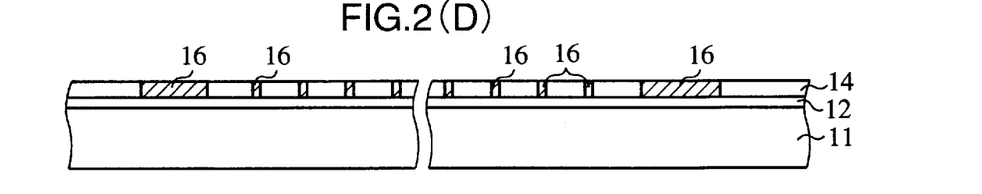

At the next step (iii), the portion of the photosensitive coating film 14 corresponding to the pattern of the maximum amount of light exposure, herein the black matrix pattern, is developed for laying open the transparent electrically conductive layer 12 to a shape corresponding to the black matrix pattern. The transparent substrate 11 is immersed in an electrodeposition bath having black-hued pigment dispersed therein and electrical voltage is applied to the transparent electrically conductive layer 12 for precipitating the black-hued electrodeposition material. The resulting assembly is washed thoroughly with water and dried to have a black matrix pattern 16 free of pinholes (FIG. 2D).

Figure 2E:
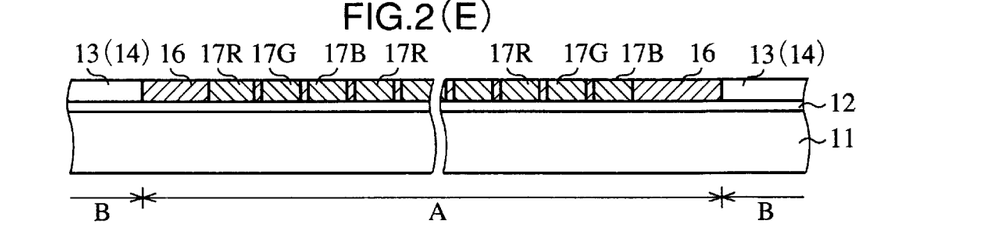
Figure 2F:
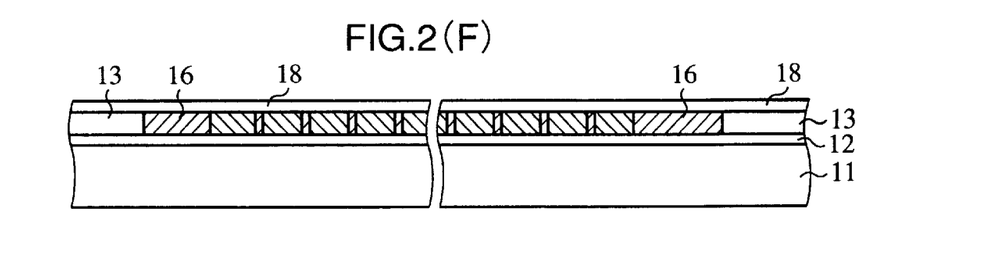

In a similar manner, development and electrodeposition are carried out in the order of the decreasing amount of light exposure to form the red-hued pattern 17R, the green-hued pattern 17G and the blue-hued pattern 17B (FIG. 2E). The resulting assembly is baked at 180 to 250° C. for 30 to 180 minutes for completing the color filter substrate.

By the above process, the black matrix 16 and the colored layers 17 are formed in the region A of the transparent substrate 11, while the photosensitive coating film 14 having substantially the same thickness as that of the black matrix is left in the region B of the transparent substrate 11, so that a resin layer 13 formed by the photosensitive coating film 14 is formed. That is, the resin layer 13 is completely formed in the region B with completion of the formation of the colored layers 17 and the black matrix 16.

Referring to FIG. 3, a second embodiment of the method for producing a color filter substrate according to the present invention is explained.

Figure 3A:
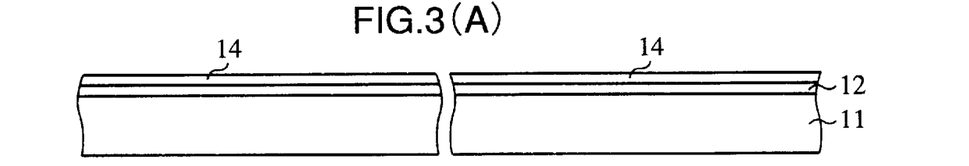
FIGS. 3A to 3G are schematic views for illustrating another embodiment of the method for producing a color filter substrate according to the present invention.

First, at step (i), a transparent electrically conductive layer 12 formed of indium tin oxide (ITO), for example is formed on the overall surface of the transparent substrate 11 having plural color filters thereon. A photosensitive resist is then applied on the transparent electrically conductive layer 12 for forming a photosensitive coating film 14, as shown in FIG. 3A. This step (i) is the same as the step (i) of the first embodiment described above.

Figure 3B:
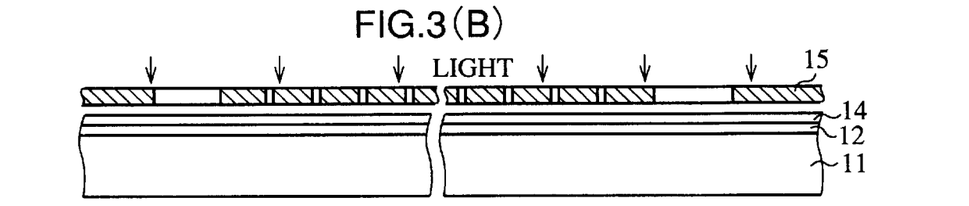
Figure 3C:
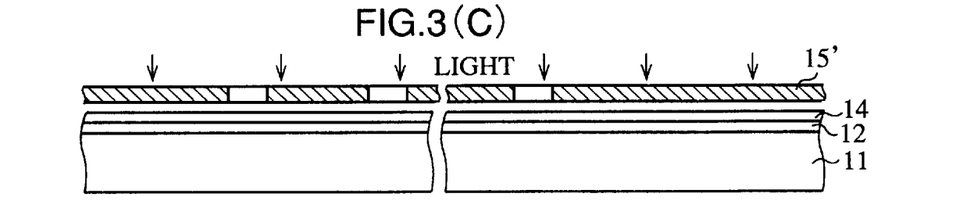

At the next step (ii), the photosensitive coating film 14 is exposed to light via a photomask 15 corresponding to a desired pattern, such as a black matrix pattern (FIG. 3B). The photosensitive coating film 14 is then exposed to light via a photomask 15' corresponding to a red-hued pattern 17R and a green-hued pattern 17G (FIG. 3C). This light exposure is carried out as stepwise light exposure in which the amount of the exposing light is decreased stepwise in the order of, for example the black matrix, the red-hued pattern and the green-hued pattern.

Figure 3D:
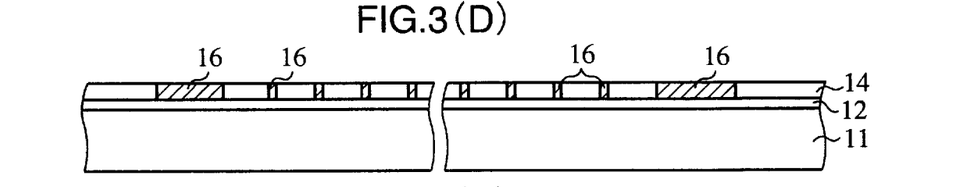

At the next step (iii), the portion of the photosensitive coating film 14 corresponding to the pattern of the maximum amount of light exposure, herein the black matrix pattern, is developed for laying open the transparent electrically conductive layer 12 to a shape corresponding to the black matrix pattern. The transparent substrate 11 then is immersed in an electrodeposition bath having black-hued pigment dispersed therein and electrical voltage is applied to the transparent electrically conductive layer 12 for precipitating the black-hued electrodeposition material. The resulting assembly is thoroughly washed with water and dried to have a black matrix pattern 16 free of pinholes (FIG. 3D).

In a similar manner, development and electrodeposition are carried out in the order of the decreasing amount of light exposure to form the red-hued pattern 17R and the green-hued pattern 17G.

Figure 3E:
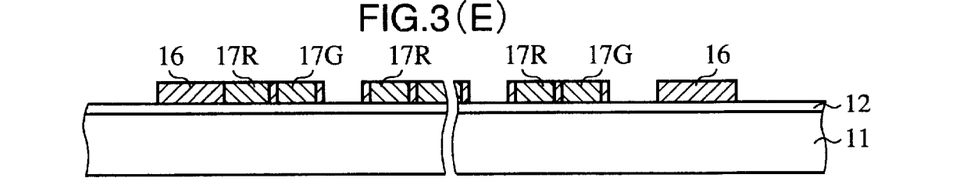
Figure 3F:
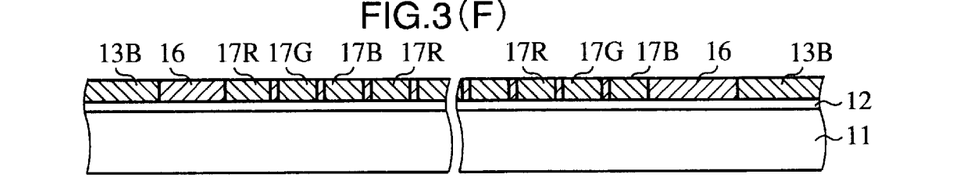
Figure 3G:
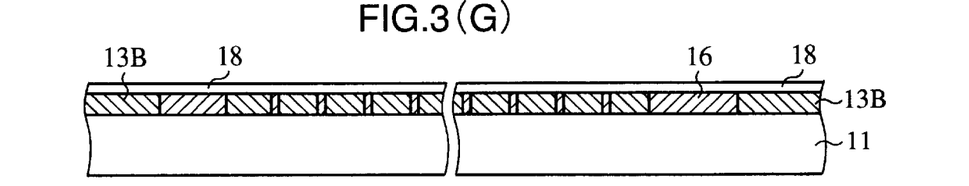

Next, at step (iv), the overall surface of the photosensitive coating film 14 on the transparent substrate 11 is exposed to light for development before forming a blue-hued pattern 17B. This lays open the portion of the transparent electrically conductive layer 12 corresponding to the blue-hued pattern forming area and to the region B peripherally adjacent to the region A (FIG. 3E). After the development, electrodeposition is carried out using a blue-hued electrodeposition coating material for forming the blue-hued pattern 17B, while at the same time as a resin layer 13B comprised of the blue-hued electrodeposited film is formed in the region B (FIG. 3F). The resulting assembly is baked at 180 to 250° C. for 30 to 180 minutes for forming a color filter substrate.

By the above process, the black matrix 16 and the colored layers 17 are formed in the region A, while the resin layer 13B formed by the blue-hued electrodeposited film is formed in the region B. That is, formation of the resin layer 13B in the region B is completed with completion of formation of the colored layers 17 and the black matrix 16.

Although the resin layer 13B is formed in he above-described embodiment by the blue-hued electrodeposited film, the resin layer 13B may, of course, be of the color of any of the other colored layers, such as red or green, or the black matrix 16.

In addition, in the above-described second embodiment, the overall surface of the photosensitive coating film 14 is exposed to light prior to formation of the ultimate colored layer and after development the resin layer 13B formed by the colored layer is formed in the region B by electrodeposition. As a third embodiment, for forming the resin layer 13 of the color of the black matrix or one of the colored layers by electrodeposition, the region B may be exposed to light and subjected to development at the same time as the black matrix 16 and the colored layers 17 are formed in the region A.

Figure 4A:
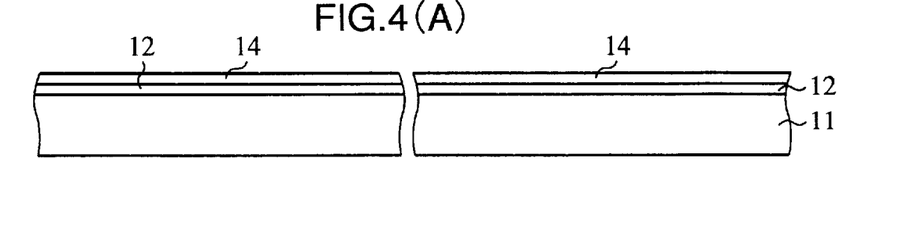
FIGS. 4A to 4E are schematic views for illustrating still another embodiment of the method for producing a color filter substrate according to the present invention.
Figure 4B:
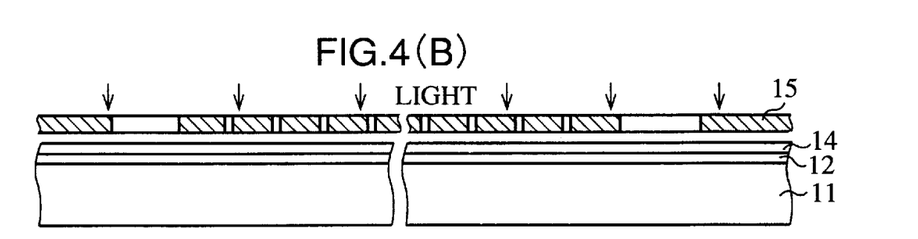
Figure 4C:
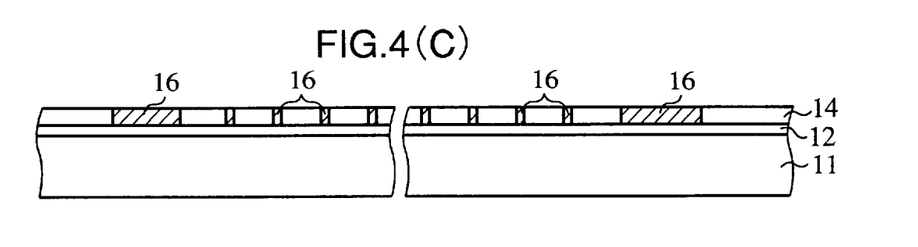

In the above-described method for producing the color filter substrate, stepwise light exposure is carried out at step (ii) and development and electrodeposition are carried out at step (iii) in the order of the decreasing amounts of light exposure. However, the method of the present invention for producing the color filter substrate is not limited thereto. That is, light exposure, development and electrodeposition may be repeatedly carried out for each of the black matrix pattern and the respective colored patterns instead of performing stepwise light exposure in accordance with the fourth embodiment of the present invention. FIG. 4 illustrates the method for producing the color filter substrate of the fourth embodiment. Referring to FIG. 4, at step (i), a transparent electrically conductive layer 12 of a transparent electrically conductive material, such as indium tin oxide (ITO), is formed on the overall surface of the transparent substrate 11 having plural color filters thereon. A photosensitive resist is then applied on the transparent electrically conductive layer 12 for forming a photosensitive coating film 14 (FIG. 4A). This step (i) is similar to the step (i) of the first embodiment described above.

Then, at step (ii), the photosensitive coating film 14 is exposed to light via a photomask 15 corresponding to a desired pattern, such as a black matrix pattern (FIG. 4B). Then, by development and drying, the portion of the transparent electrically conductive layer 12 is laid open to a shape corresponding to the black matrix pattern. The transparent substrate 11 is then immersed in an electrodeposition bath having black-hued pigment dispersed therein. Electrical voltage is then applied to the transparent electrically conductive layer 12 for precipitating the black-hued electrodeposition material. The resulting assembly is thoroughly washed with water and dried for forming a pinhole-free black matrix pattern 16.

Figure 4D:
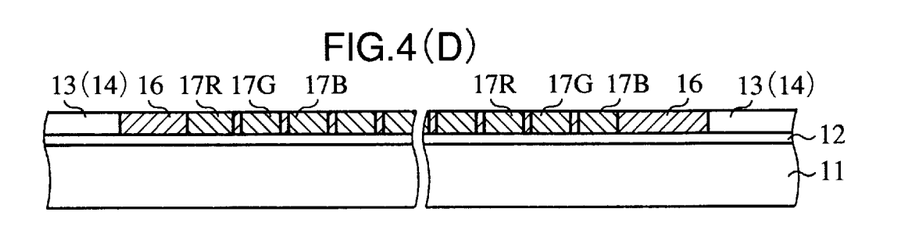
Figure 4E:
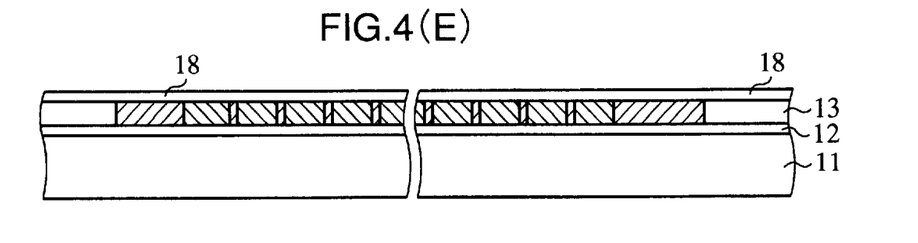

In a similar manner, a red-hued pattern 17R, a green-hued pattern 17G and a blue-hued pattern 17B are formed (FIG. 4D). The resulting assembly is then baked at 180 to 250° C. for 30 to 180 minutes for forming a color filter substrate.

By the above process, the black matrix 16 and the colored layers 17 are formed in the region A of the transparent substrate 11, while the photosensitive coating film 14 is left in the region B of the transparent substrate 11, so that the resin layer 13 formed by the photosensitive coating film 14 is formed. That is, the resin layer 13 is completely formed in the region B simultaneously with completion of the formation of the colored layers 17 and the black matrix 16.

Referring to FIG. 5, a fifth embodiment of the method for producing a color filter substrate according to the present invention is explained.

Figure 5A:
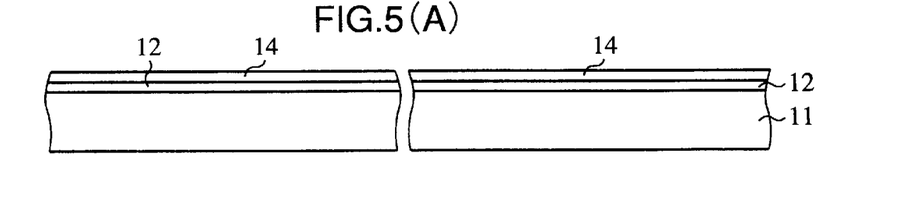
FIGS. 5A to 5F are schematic views for illustrating yet another embodiment of the method for producing a color filter substrate according to the present invention.

First, at step (i), a transparent electrically conductive layer 12 formed of a transparent electrically conductive material, such as indium tin oxide (ITO), is formed on the overall surface of the transparent substrate 11 having plural color filters thereon. A photosensitive resist is then applied on the transparent electrically conductive layer 12 for forming a photosensitive coating film 14, as shown in FIG. 5A. This step (i) is same as the step (i) of the first embodiment described above.

Figure 5B:
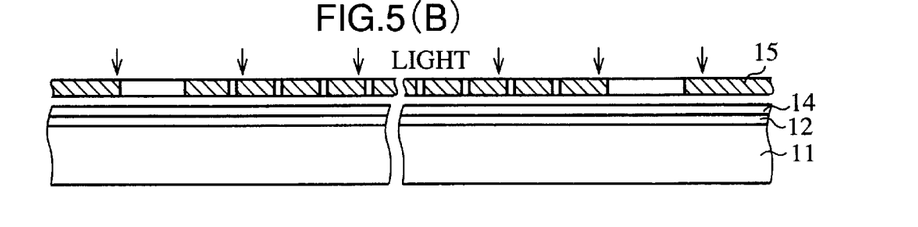
Figure 5C:
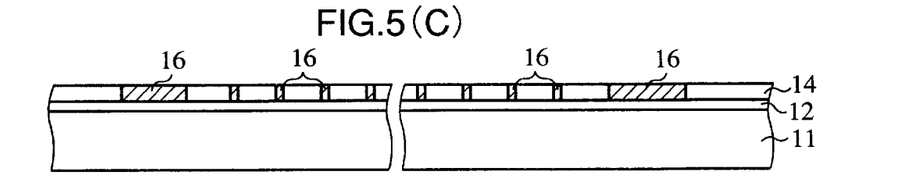

At the next step (ii), the photosensitive coating film 14 is exposed to light via a photomask 15 corresponding to a desired pattern, such as a black matrix pattern (FIG. 5B). Then, by development and drying, a portion of the transparent electrically conductive layer 12 is laid open to the shape corresponding to the black matrix pattern. The transparent substrate 11 is then immersed in an electrodeposition bath having black-hued pigment dispersed therein. Electrical voltage is then applied to the transparent electrically conductive layer 12 for precipitating the black-hued electrodeposition material. The resulting assembly is thoroughly washed with water and dried for forming a pinhole-free black matrix pattern 16 (FIG. 5C).

In a similar manner, a red-hued pattern 17R and a green-hued pattern 17G are formed.

Figure 5D:
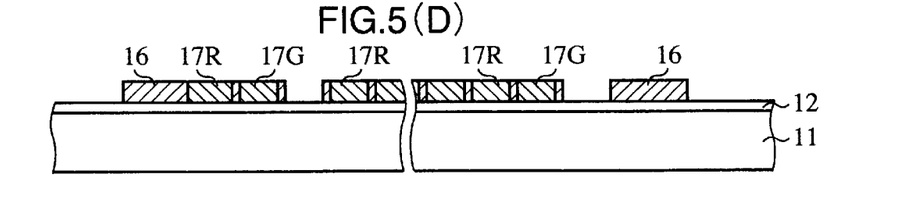
Figure 5E:
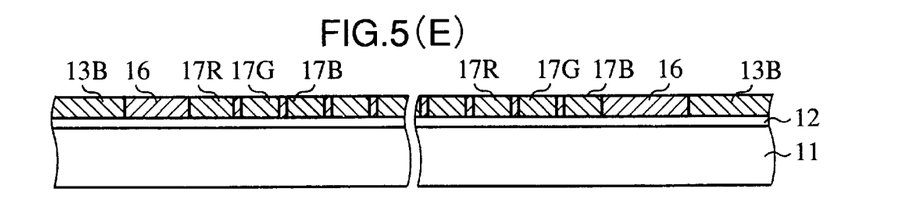
Figure 5F:
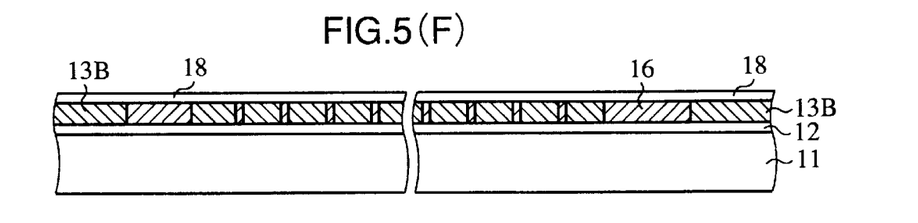

Then, in step (iii), the overall surface of the photosensitive coating film 14 on the transparent substrate 11 is exposed to light prior to formation of a blue-hued pattern 17B. This lays open the portion of the transparent electrically conductive layer 12 corresponding to the blue-hued pattern forming area and to the region B peripherally adjacent to the region A of the transparent substrate 11 (FIG. 5D). After development, a blue-hued electrodeposition coating is electrodeposited for forming the blue-hued pattern 17B, while at the same time a resin layer 13B formed by the blue-hued electrodeposited film is formed in the region B (FIG. 5E). The resulting assembly is then baked at 180 to 250° C. for 30 to 180 minutes for forming a color filter substrate.

By the above process, the black matrix 16 and the colored layers 17 are formed in the region A, while the resin layer 13B formed by the blue-hued electrodeposited film is formed in the region B. That is, formation of the resin layer 13B in the region B is completed with the completion of formation of the colored layers 17 and the black matrix 16.

Although the resin layer 13B is formed in the above fifth embodiment by the blue-hued electrodeposited film, the resin layer 13 may, of course, be of the color of any of the other colored layers, such as red or green, or the black matrix 16.

In addition, in the above fifth embodiment, the overall surface of the photosensitive coating film 14 is exposed to light prior to formation of the ultimate colored layer and the resin layer 13 formed by the ultimate colored layer is formed in the region B by development followed by electrodeposition. As a sixth embodiment, for forming the resin layer 13 of the color of the black matrix or any one color of the colored layers by electrodeposition, the region B may be exposed to light and subjected to development at the same time as the black matrix 16 and the colored layers 17 are formed in the region A.

The electrodeposition material employed in the step (iii) of the first to third embodiments and in the step (ii) of the fourth to sixth embodiments, may generally be an organic high molecular material well-known in the field of electrodeposition coating. The electrodeposition coating is classified, depending upon the electrochemical reaction with a main electrode, into cationic electrodeposition and anionic electrodeposition, in which the electrodeposition material exists and functions as cations or anions, respectively. The organic high molecular materials employed for electrodeposition may be enumerated by organic high molecular materials such as natural oils and fats, synthetic oils and fats, alkyd resins, polyester resins, acrylic resins or epoxy resins.

Among known anionic electrodeposition materials, maleinated oils and polybutadiene resins are known. These materials are cured by the oxidation polymerization reaction. As cationic electrodeposition materials, epoxy resins, for example, are preferably employed by itself or with modification. In addition, polyamino-based resins, such as melamine or acrylic resins, are preferably employed for forming rigid colored layers by thermal curing or photocuring.

In the electrodeposition in the production of a color filter substrate, finely divided pigments or dyestuffs are dispersed in an anionic or cationic electrodeposition bath for co-precipitation in an electrically conductive portion along with ionic high molecular materials.

With the black matrix 16 and the colored layers 17 thus formed, the transparent electrically conductive layer 12 on the transparent substrate 11 is divided into the region A having the black matrix 16 and the colored layers 17 formed or the transparent electrically conductive layer 12 and the region B disposed peripherally adjacent to the region A and having the resin layer 13 formed on the transparent electrically conductive layer 12.

A transparent electrode 18 is then formed for covering the colored layers 17 (FIGS. 2F, 3G, 4E and 5F). The transparent electrode 18 formed of indium tin oxide (ITO), zinc oxide (ZnO), tin oxide (SnO) or alloys thereof, is formed on the overall substrate surface by well-known film-forming methods, such as sputtering, vacuum deposition or chemical vapor deposition (CVD) without employing a mask.

The present invention thus provides a color liquid crystal display device having high cell gap precision and high operational reliability in which a black matrix and colored layers of plural colors are formed in pre-set patterns in the region A on the transparent substrate of the color filter substrate constituting the color liquid crystal display device, and a resin layer is formed in the region B disposed peripherally adjacent to the region A, so that the step difference may be effectively prevented from being formed between the black matrix of the region A and the resin layer formed in the region B, and a sealing material arranged in abutment with the rein layer and the black matrix portion disposed on the peripheral portion of the region A may be of uniform thickness. Thus, it becomes possible to prohibit sealing troubles between the color filter substrate and the counterelectrode substrate when bonding the two substrates for forming cells via the sealing material. In addition, the color liquid crystal display device may be provided which is inexpensive and superior in picture quality by fabricating the color filter substrate by the electrodeposition method, thereby simplifying the production process and lowing production cost.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A color liquid crystal display device comprising a color filter substrate, a counterelectrode substrate disposed to oppose said color filter substrate via a sealing material disposed in contact with peripheral portions of said color filter substrate and said counterelectrode substrate, and a liquid crystal layer sealed between said color filter substrate and said counterelectrode substrate and surrounded by said sealing material, said color filter substrate comprising a transparent substrate, a black matrix and a plurality of colored layers of plural colors, said black matrix and said colored layers being formed in a predetermined pattern in a first region on said transparent substrate, and a resin layer having substantially the same thickness as that of said black matrix and formed in a second region on said transparent substrate positioned peripherally adjacent to said first region, said sealing material being in contact with said resin layer and a black matrix portion in the periphery of said first region.

2. The liquid crystal display device according to claim 1 wherein said black matrix has a thickness of 1.0 to 3.0 $\mu$m.

3. The liquid crystal display device according to claim 1 wherein a thickness difference between the black matrix and the resin layer is not more than 0.8 $\mu$m.

4. The color liquid crystal display device according to claim 1, wherein said color filter substrate further comprises a transparent electrically conductive layer between said transparent substrate, and said black matrix, said plurality of said colored layers and said resin layer over the first and second regions on said transparent substrate.

5. The color liquid crystal display device according to claim 4, wherein said transparent electrically conductive layer on said first region on the transparent substrate is electrically insulated from at least a peripheral portion of said transparent electrically conductive layer in said second region on the transparent substrate.

6. The color liquid crystal display device according to claim 1, wherein said color filter substrate further comprises a polarizing plate disposed on said transparent substrate opposite to said black matrix and said colored layers, and a transparent electrode for driving liquid crystal on said black matrix and said plurality of said colored layers and wherein said color filter substrate further comprises an alignment layer between said transparent electrode and said liquid crystal layer.

7. The color liquid crystal display device according to claim 1, wherein said counterelectrode substrate comprises a transparent substrate, a polarizing plate disposed on said transparent substrate opposite to said liquid crystal layer, a plurality of thin film transistors and a transparent electrode both disposed on said transparent substrate opposite to said polarizing plate, and an alignment layer disposed between said transparent electrode and said liquid crystal layer.

8. The color liquid crystal display device according to claim 1, wherein said black matrix contains in a resin one member selected from the group consisting of colorants, pigments, carbon black, fine metal particles and mixtures thereof.

9. The color liquid crystal display device according to claim 1, wherein said resin layer is a photosensitive coating film.

10. The color liquid crystal display device according to claim 1, wherein said resin layer is a colored electrodeposited film.

* * * * *